(12) United States Patent
Higgs (10) Patent No.: US 12,092,259 B2
(45) Date of Patent: Sep. 17, 2024

(54) WALL MOUNT PRO

(71) Applicant: Brion Higgs, Knightdale, NC (US)

(72) Inventor: Brion Higgs, Knightdale, NC (US)

( * ) Notice: Subject to any disclaimer, the term of this patent is extended or adjusted under 35 U.S.C. 154(b) by 86 days.

(21) Appl. No.: 17/727,517

(22) Filed: Apr. 22, 2022

(65) Prior Publication Data

US 2022/0341538 A1    Oct. 27, 2022

Related U.S. Application Data (63) Continuation-in-part of application No. 29/780,140, filed on Apr. 22, 2021.

(60) Provisional application No. 63/178,406, filed on Apr. 22, 2021.

(51) Int. Cl.
*F16M 13/02* (2006.01)

(52) U.S. Cl.
CPC .................................. *F16M 13/02* (2013.01)

(58) Field of Classification Search
CPC ....... F16M 13/02; F16M 13/022; F16M 13/00
USPC ...................................... 248/466, 476, 475.1
See application file for complete search history.

(56) References Cited

U.S. PATENT DOCUMENTS

| | | | | |
|---|---|---|---|---|
| 2,204,862 A * | 6/1940 | Lehman | ................. | A47G 1/215 |
| | | | | 40/785 |
| 3,049,323 A * | 8/1962 | Peterka | ................. | A47G 1/215 |
| | | | | 248/488 |
| 3,666,225 A * | 5/1972 | Weinberger | ............... | E03D 1/01 |
| | | | | 248/205.3 |
| 4,025,015 A * | 5/1977 | Kolic | ........................ | F16L 3/08 |
| | | | | 248/229.11 |
| 4,724,643 A * | 2/1988 | Marsh | ................... | E06B 3/5481 |
| | | | | D8/382 |
| 5,249,765 A * | 10/1993 | Garcia | ................. | A47G 1/1606 |
| | | | | 248/475.1 |
| 7,775,497 B2 * | 8/2010 | Segal | ..................... | A47G 1/215 |
| | | | | 248/490 |
| 7,931,159 B2 * | 4/2011 | Kao | ...................... | A47F 5/0838 |
| | | | | 211/94.01 |
| 8,297,571 B2 * | 10/2012 | Xue | ....................... | F16M 11/10 |
| | | | | 248/220.22 |
| 8,925,886 B2 * | 1/2015 | Sears | ................. | F16M 11/2014 |
| | | | | 248/220.21 |

(Continued)

FOREIGN PATENT DOCUMENTS

JP    3037882 U    5/1997

OTHER PUBLICATIONS

Plastic Mirror Clip, Retrieved from Internet, Retrieved on Mar. 16, 2021 <URL: https://www.homedepot.com/p/OOK-1-8-in-Plastic-Mirror-Clip-8-Pack-534271/301942186?MERCH=REC-_-pipsem-_-202341243-_-301942186-_-N>.

(Continued)

*Primary Examiner* — Monica E Millner (57) ABSTRACT

A mounting bracket for securing heavy objects safely to the wall. The present invention has a cylinder-shaped fastening body that has a hole running through the middle of the fastening body. The cylinder has a countersink on one end of the cylinder allowing the screw to maintain a flat continuous surface when fully screwed in. The cylinder has arms extending outwards off the cylinder with flat mounting surfaces at the end of the arms. A supporting body rests across the mounting surfaces to provide better support to a heavy object being hung against the wall.

10 Claims, 8 Drawing Sheets

(56) References Cited

U.S. PATENT DOCUMENTS

| | | | | |
|---|---|---|---|---|
| 9,801,477 | B2* | 10/2017 | Krake | A47G 1/1633 |
| 9,820,591 | B2* | 11/2017 | Popkin | A47G 1/1666 |
| 11,578,833 | B2* | 2/2023 | Woolman | A47B 96/06 |
| 2006/0186304 | A1* | 8/2006 | McGee | A47G 1/1606 |
| | | | | 248/476 |
| 2008/0098664 | A1* | 5/2008 | McGregor | A47G 1/215 |
| | | | | 248/231.91 |

OTHER PUBLICATIONS

Ribbed Turnbuttons, Retrieved from Internet, Retrieved on Mar. 16, 2021 <URL: https://www.michaels.com/1in-ribbed-turnbuttons/10155481.html>.

Offset Mounting Canvas Z Clips For Picture Framing, Retrieved from Internet, Retrieved on Mar. 16, 2021 <URL: https://www.walmart.com/ip/Offset-Mounting-Canvas-Z-Clips-For-Picture-Framing-6-X-3-8-Pan-Head-Screws-Included-1-8-1-1-4-Depths/161175031>.

Fre Extinguisher Bracket, Retrieved from Internet, Retrieved on Mar. 16, 2021 <URL: https://www.uline.com/Product/Detail/H-5934/Fire-Protection/Fire-Extinguisher-Bracket-20-lb-Standard-Wall-Mount>.

L-Shape Mounting, Retrieved from Internet, Retrieved on Mar. 16, 2021 <URL: https://www.dkhardware.com/silver-metallic-I-shape-mounting-bracket-6-tall-awsb1c6sm-product-56325.html>.

\* cited by examiner

WALL MOUNT PRO

The current application claims a priority to the U.S. Provisional Patent application Ser. No. 63/178,406 filed on Apr. 22, 2021.

FIELD OF THE INVENTION

The present invention relates generally to a wall fastening device. More specifically, the present invention is a device that can hold equipment on a wall with a variety of different thicknesses.

BACKGROUND OF THE INVENTION

Within a building space many objects are hung and fixed to the surrounding wall surfaces. In our homes we hang televisions, shelves, hooks and other items to the wall in order to free up the surrounding areas on the floor. In some places, such as a restaurant, many more devices than usual are placed on the walls, such as modems, routers, and other electronic equipment due to an extremely limited office or workspace. Currently people attempt to solve these issues by creating large rig systems to hold the electronic devices on the wall and out of the way. The issue with this is that these rig systems both take up more space than the actual component itself and take a long time to fully set up. Another solution is using adhesive strips to attach the object to the wall in a semi-permanent setup. Unfortunately, with adhesives the user must ensure that it will create a proper bond between the object material and the wall material or risk that the adhesive will not be able to fully hold the weight of the object. Additionally, with an adhesive there will be a residue left behind that must be cleaned up if the user wishes to remove the setup from the wall.

An objective of the present invention is to provide users with a wall fastener, to help hold objects on a wall. The present invention intends to provide users with a device that can secure devices of varying thicknesses to a wall to create space on the floor. The present invention can be used as a plywood mount across a window or doorway to offer protection during a storm. Additionally, the present invention can be used as a sign mount to allow for the sign to be placed on a wall with an offset gap in between. In order to accomplish these uses, a preferred embodiment of the present invention comprises a fastening body, a plurality of arm supports, and a mount wall. Some other additional uses for the present invention consist of switches, routers, caller ID boxes, cable modems, cable boxes, monitors, transformers, power supplies, surge suppressors, power strips, access points, KVM's, tablets, small computers, clients, music on hold devices, DVRs, NVRs, Video switches, amongst countless other items. Further, the fastening body allows the present invention to properly secure an object to a wall. Thus, the present invention is wall fastener that can hold devices of varying thicknesses to a wall without the need for large rigging systems or adhesives.

DETAIL DESCRIPTIONS OF THE INVENTION

All illustrations of the drawings are for the purpose of describing selected versions of the present invention and are not intended to limit the scope of the present invention.

Figure 1:
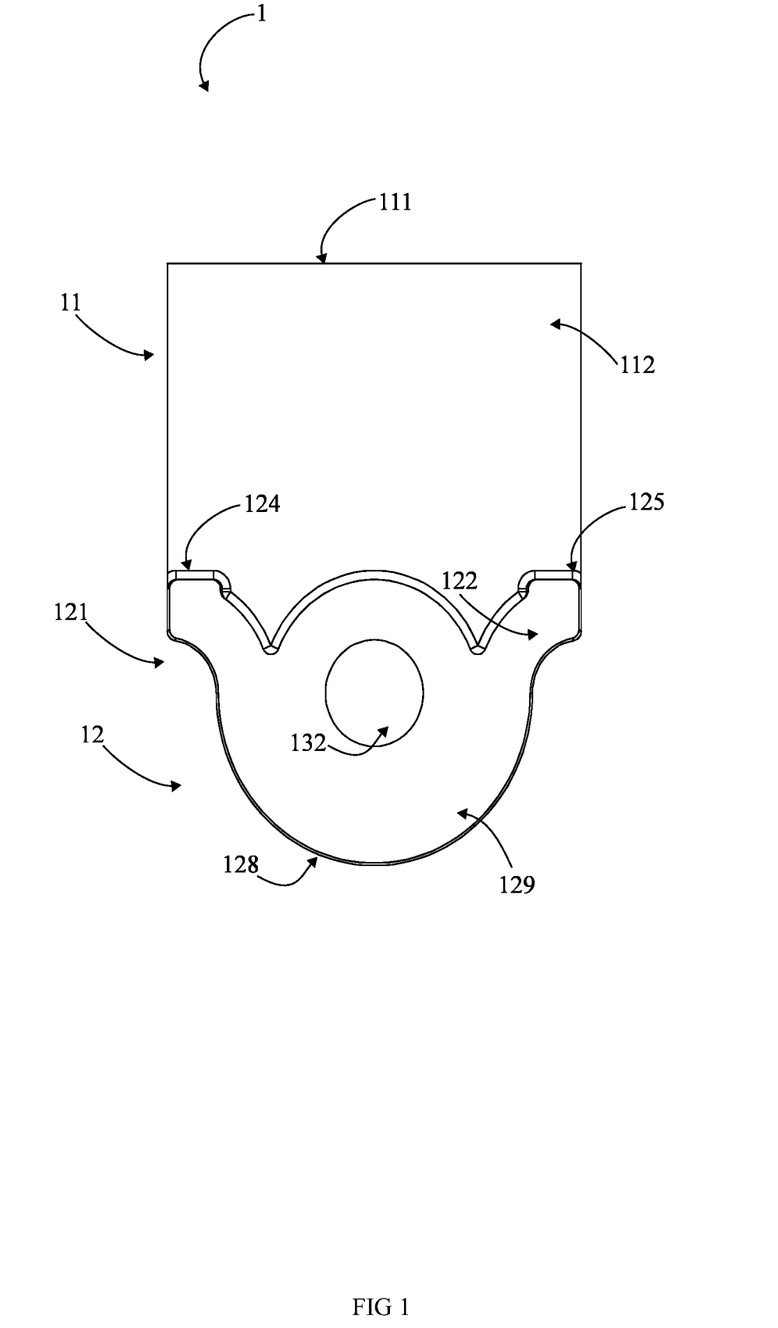
FIG. 1 is a perspective view of the present invention.

As shown in FIG. 1, the present invention is a mounting bracket apparatus 1. An objective of the present invention is to provide users with a mounting apparatus that can hold various sized objects to a wall without large rigs or adhesives. To accomplish this the present invention comprises a mounting body 12 and a mounting panel 11.

The mounting body 12 is located at the base of the present invention. A fastening body 128 and a plurality of arm supports 121 form the mounting body 12, with the arm supports 121 extending in an outwardly direction from the fastening body 128. In the preferred embodiment, the plurality of arm supports 121 comprises a first arm 124 and a second arm 125. These components allow for the user to safely secure an object to a wall without the risk of the object falling. Creating a perpendicular angle with the fastening body 128 and the plurality of arm supports 121, is the mounting panel with the panel end 111 being opposite the end connected to the fastening body 128. The mounting panel 11 having a first mounting surface 112 which lays in direct contact with the object that is being hung. The fastening body 128 has a fastening surface 129 which lays in direct contact with the wall the object is being hung against. Between the plurality of arm supports 121, the outer edge of the fastening body is parallel with each of the second mounting surface.

Each of the plurality of arm supports 121 have an arm body 122 and a second mounting surface 123. The arm body 122 is adjacent between the second mounting surface 123 and the fastening body 128. A mounting aperture 132 is found centrally positioned on the fastening body 128. The mounting aperture 132 of the fastening body 128 ensures that the user can drive a screw through the present invention to secure it to a wall surface. Thus, the present invention is wall fastener that can hold devices of varying thicknesses to a wall without the need for large rigging systems or adhesives.

Figure 4:
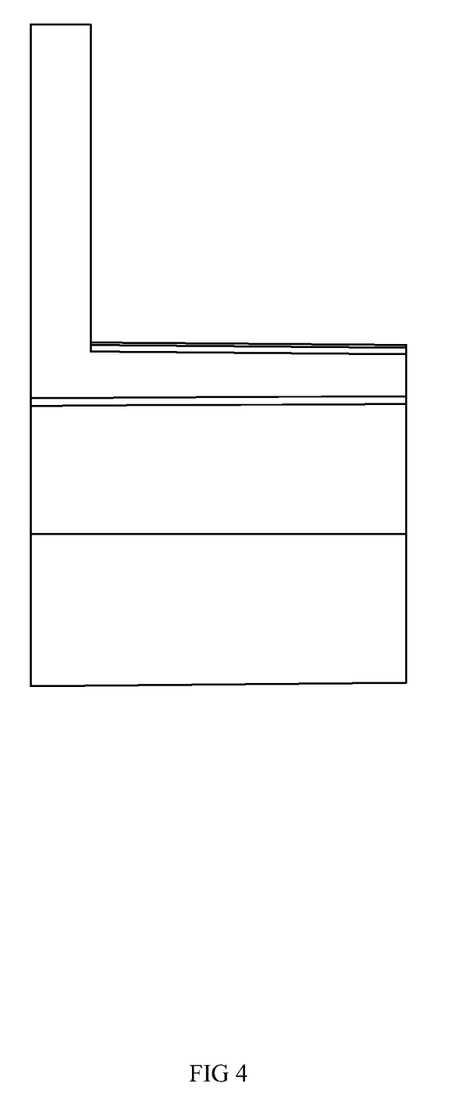
FIG. 4 is a right-side view of the present invention.
Figure 5:
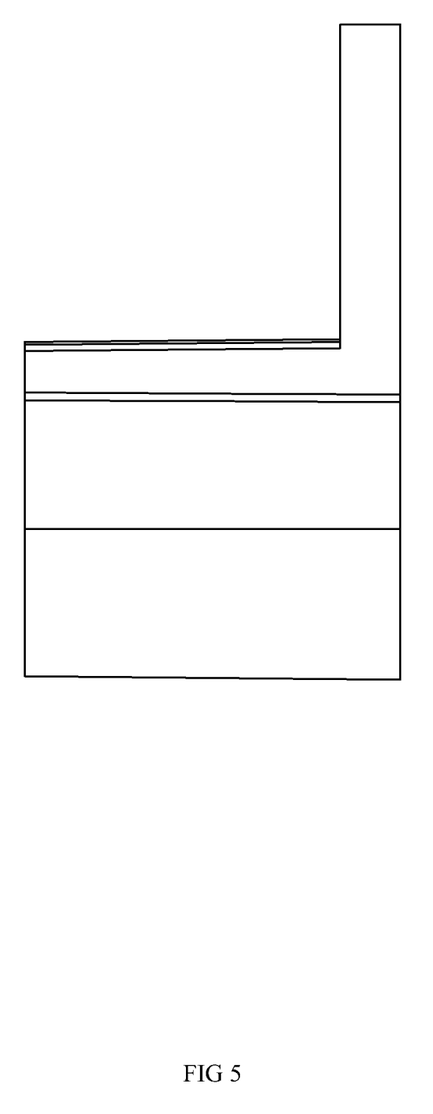
FIG. 5 is a left-side view of the present invention.
Figure 6:
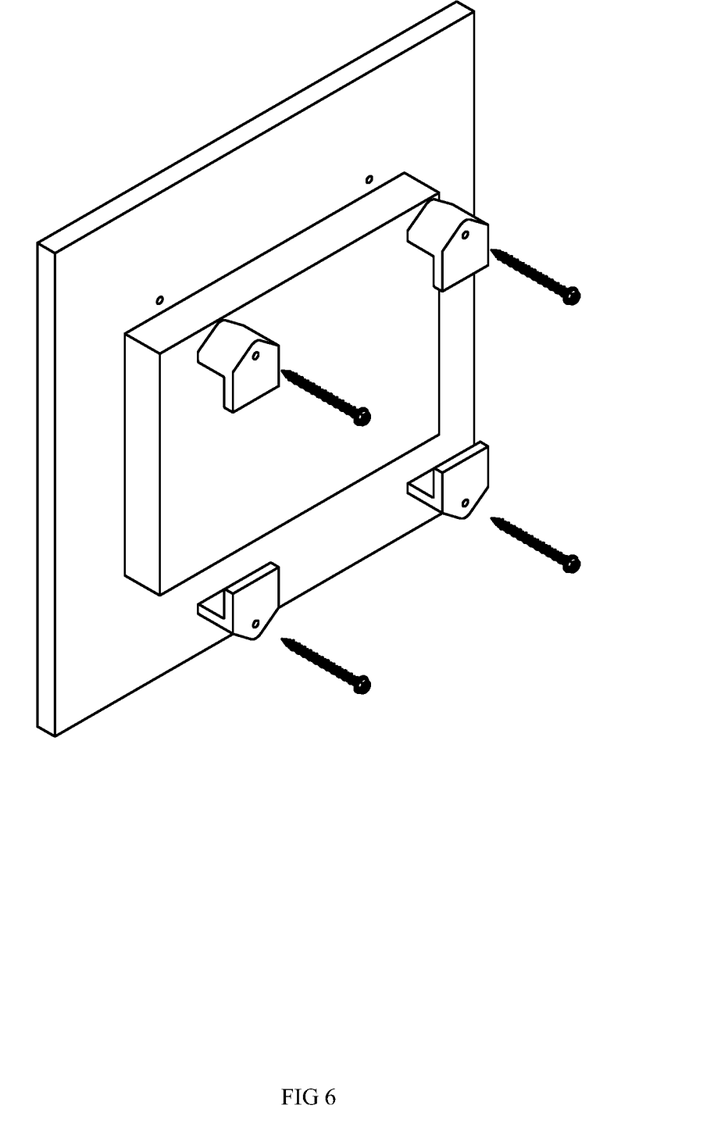
FIG. 6 is an illustration of the present invention in use
Figure 7:
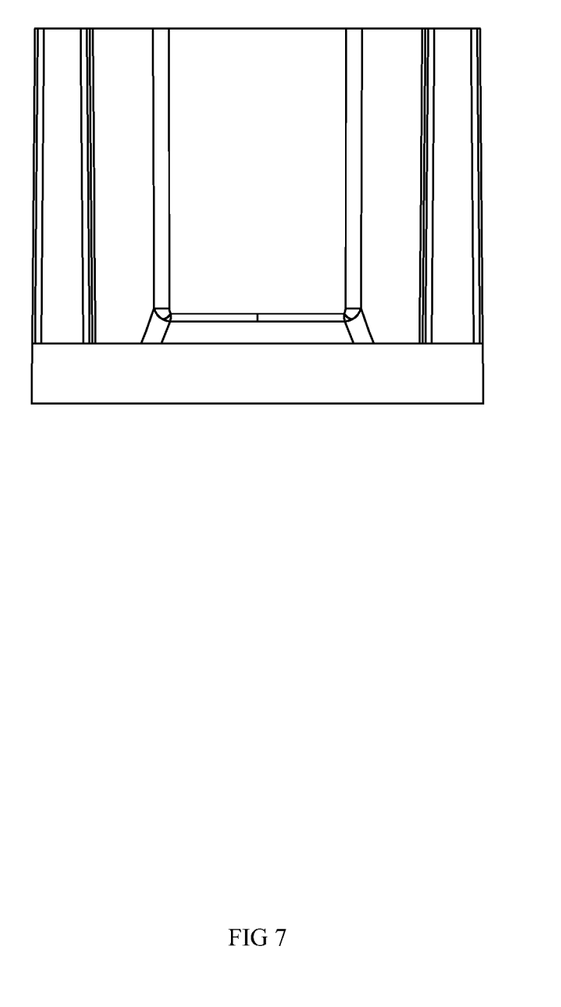
FIG. 7 is a top view of the present invention.
Figure 8:
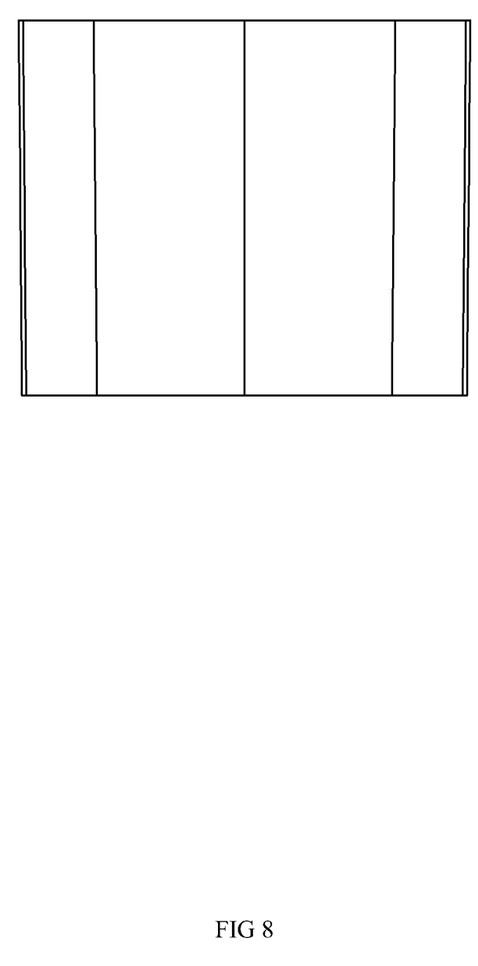
FIG. 8 is a bottom view of the present invention.

The present invention can secure objects to the wall with the mounting bracket apparatus 1. The mounting bracket apparatus 1 allows the present invention to secure various objects such as, batteries, switches, routers, screens, personal computers, cable boxes, and modems but is not limited to just these items. The mounting bracket apparatus 1 is made of a lightweight plastic or other recyclable material, designed with a cylindrical shape. In its preferred embodiment the fastening body 128 comprises a mounting aperture 132 and a countersink 133. The mounting aperture 132 is located in the central section of the fastening body 128 as seen in FIG. 1. The mounting aperture 132 is a cylindrical cut out that goes through the entirety of the fastening body 128. The mounting aperture 132 is designed to allow the user to drive a screw through the present invention fastening it to a wall. The mounting aperture 132 is also designed with a length that allows the present invention to retain its position when fastened on a wall to ensure that it does not spin out when holding an object. Additionally, the countersink 133 is located on the front side of the fastening body 128 in the center. The countersink 133 is designed as a chamfered edge around the circumference of the mounting aperture 132 with a small angle of about 30 degrees seen in FIG. 4. This design allows the user to screw into the present invention and allow the screw head to lay flush with the front surface 131 of the fastening body 128. This also ensures that when tightly fastening the present invention to the wall the screw will be less likely to damage and crack the wall mount pro material. It should be further noted that, the fastening body 128 can be created in many various shapes and sizes and countersink 133 can be chamfered with various degrees in an alternative variation while still staying within the scope of the present invention. In an alternative embodiment the present invention is designed with a UV protected material. This allows the mounting bracket apparatus 1 to be used and placed in an outdoor environment without the risk of the sun damaging and reducing the strength of the present invention.

Figure 2:
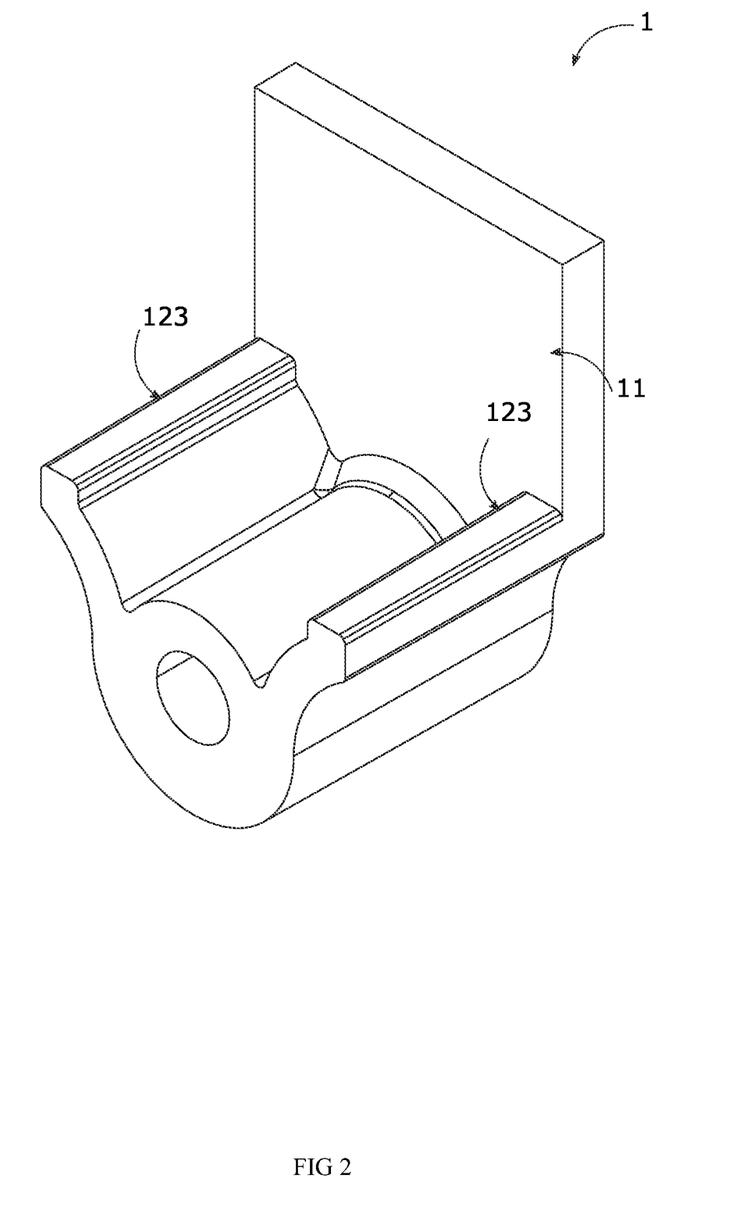
FIG. 2 is a rear perspective view of the present invention.
Figure 3:
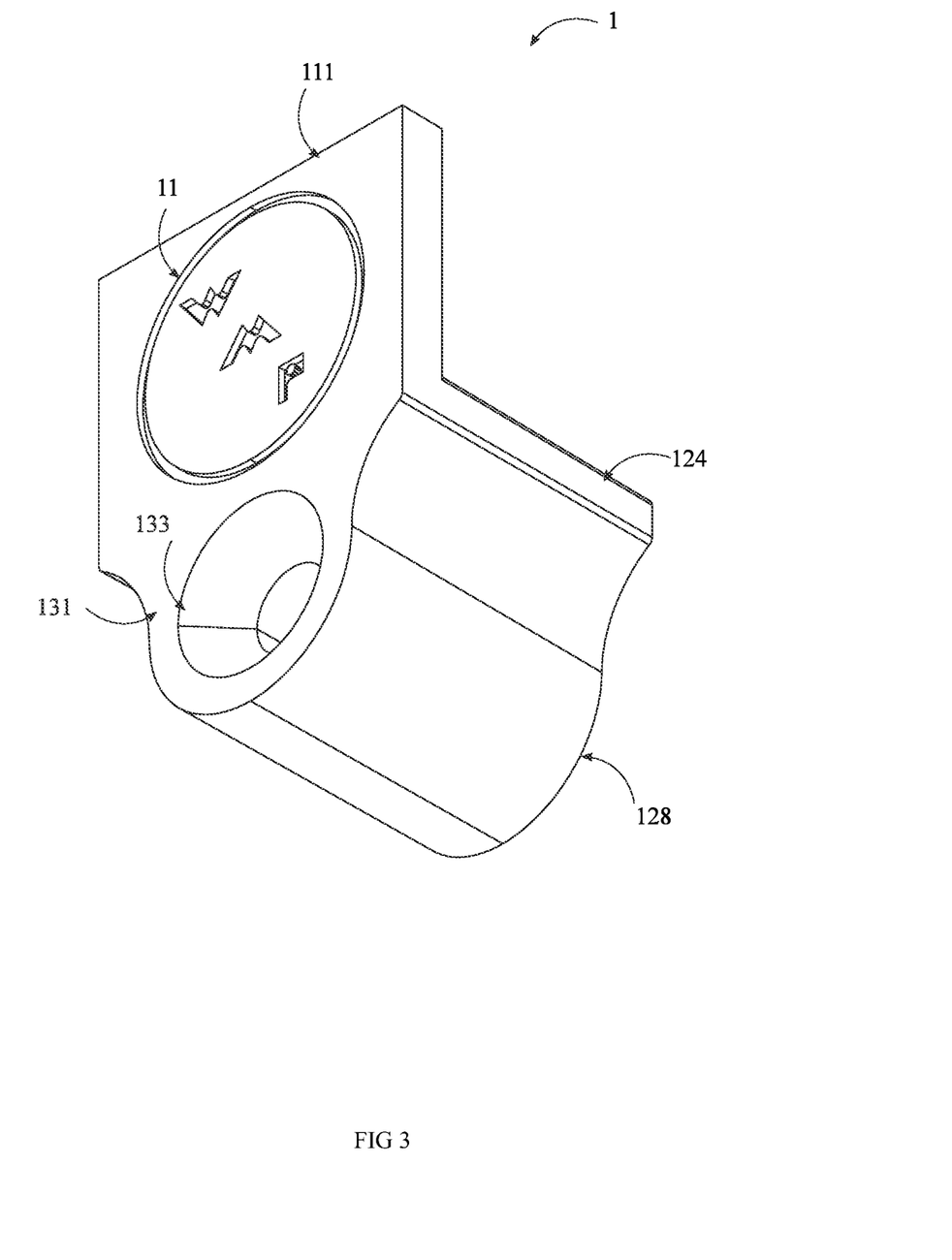
FIG. 3 is a front view of the present invention.

The plurality of arm supports 121 connects with the fastening body 128 on opposite sides of the cylinder circumference. In its preferred embodiment the plurality of arm supports 121 is designed as a rounded shape that moves in an upward direction as seen in FIG. 2. This design allows for the plurality of arm supports 121 to hold any object placed on the flat edge. The plurality of arm supports 121 provides a vertical force on any object secured to ensure that it stays off the ground surface. The plurality of arm supports 121 also give the present invention a lightweight design that allows the same structural support with less physical material to create an easier setup and lowers manufacturing costs.

Adjacent to the plurality of arm supports 121 is the mounting panel 11. The mounting panel 11 is designed with a rectangular shape and made of a similar plastic material as the fastener body 128. In its preferred embodiment the mounting bracket apparatus 1 comprises a wall mount pro logo. The wall mount pro logo can be designed with a variety of different shapes and lettering fonts without straying from the scope of the original intent. In addition to creating a design the wall mount pro logo also decreases the amount of material needed to create the present invention. The mounting panel 11 provides the present invention with a horizontal force on the object when properly secured. The mounting panel 11 with its rectangular shape allows the present invention to hold enough of the object being secured without being too large. With all the components working in tandem with each other it can be seen that the present invention is wall fastener that can hold devices of varying thicknesses to a wall without the need for large rigging systems or adhesives.

Although the invention has been explained in relation to its preferred embodiment, it is to be understood that many other possible modifications and variations can be made without departing from the spirit and scope of the invention.

What is claimed is:

1. A mounting bracket apparatus comprising:
   a mounting body wherein the mounting body is comprised of a plurality of arm supports and a fastening body;
   each of the plurality of arm supports having a first arm and a second arm;
   a countersink;
   a mounting aperture wherein the mounting aperture goes through the entirety of the fastening body;
   a mounting panel wherein the mounting panel has a first mounting surface;
   the mounting panel having a panel end opposite the end connected to the fastening body;
   the mounting panel having two sets of parallel sides;
   the two sets of parallel sides being of different lengths; and
   the mounting panel being connected perpendicularly the plurality of arm supports along a longer side of the mount wall panel.

2. The mounting bracket apparatus as in claim 1 further comprising:
   the fastening body having a front side and a rear side;
   the rear side of the fastening body having a fastening surface; and
   the countersink being located on the front side of the fastening body.

3. The mounting bracket apparatus as in claim 2 further comprising:
   the mounting aperture being centrally located on the fastening body; and
   the mounting aperture being a cylindrical cut.

4. The mounting bracket apparatus as in claim 1 further comprising:
   each of the plurality of arm supports having an arm body;
   each of the plurality of arm supports extending outward from the fastening body;
   each of the plurality of arm supports each having a second mounting surface;
   the second mounting surface being located at an end of the arm supports where the second mounting surface is opposite the end connected fastening body; and
   the fastening body's outer edge being uniformly parallel with each of the second mounting surface.

5. A mounting bracket apparatus comprising:
   a mounting body wherein the mounting body is comprised of a plurality of arm supports and a fastening body;
   the plurality of arm supports having a first arm and a second arm;
   a countersink;
   a mounting aperture wherein the mounting aperture goes through the entirety of the fastening body;
   the mounting aperture being a cylindrical cut;
   a mounting panel wherein the mounting panel has a first mounting surface;
   the mounting panel having a panel end opposite the end connected to the fastening body;
   the mounting panel having two sets of parallel sides;
   the two sets of parallel sides being of different lengths; and
   the mounting panel being connected perpendicularly to the arm supports and the fastening body along one of the longer sides of the mount wall panel.

6. The mounting bracket apparatus as in claim 5 further comprising:
   the fastening body having a front side and rear side;
   the countersink being located on the front side of the fastening body;
   the fastening body having a centrally located mounting aperture;
   the mounting aperture running the entire length of the fastening body from the front side to the rear side; and
   the plurality of arm supports extending outward from the fastening body with each arm having an arm body.

7. The mounting bracket apparatus as in claim 5 further comprising:
   the plurality of arm supports each having a second mounting surface;
   the second mounting surface being located at an end of the arm supports wherein the second mounting surface is opposite the end connected to fastening body; and
   the fastening body's outer edge being uniformly parallel with each of the second mounting surface.

8. A mounting bracket apparatus comprising:
   a mounting body wherein the mounting body is comprised of a plurality of arm supports and a fastening body;

the fastening body having a front side and a rear side;

the plurality of arm supports having a first arm and a second arm;

the rear side of the fastening body having a fastening surface;

a countersink wherein the countersink is located on the front side of the fastening body;

a mounting aperture wherein the mounting aperture goes through the entirety of the fastening body;

a mounting panel wherein the mounting panel has a first mounting surface;

the mounting panel having a panel end opposite the end connected to the fastening body;

the mounting panel being connected perpendicularly the plurality of arm supports along a longer side of the mount wall panel;

the mounting panel having two sets of parallel sides;

the two sets of parallel sides being of different lengths; and the mounting panel being connected perpendicularly the plurality of arm supports a longer side of the mount wall panel.

9. The mounting bracket apparatus as in claim 8 further comprising:

the mounting aperture being centrally located on the fastening body; and the mounting aperture being a cylindrical cut.

10. The mounting bracket apparatus as in claim 8 further comprising:

the plurality of arm supports having an arm body;

the plurality of arm supports extending outward from the fastening body;

the plurality of arm supports each having a second mounting surface;

the second mounting surface being located at an end of the arm supports where the second mounting surface is opposite the end connected fastening body; and the fastening body's outer edge being uniformly parallel with each of the second mounting surface.

* * * * *